(12) United States Patent
Xing et al.

(10) Patent No.: US 11,212,703 B2
(45) Date of Patent: Dec. 28, 2021

(54) METHOD, APPARATUS AND EQUIPMENT FOR DETERMINING TRANSPORT BLOCK SIZE

(71) Applicant: CHINA ACADEMY OF TELECOMMUNICATIONS TECHNOLOGY, Beijing (CN)

(72) Inventors: Yanping Xing, Beijing (CN); Jiaqing Wang, Beijing (CN); Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 42 days.

(21) Appl. No.: 16/633,547

(22) PCT Filed: Jul. 20, 2018

(86) PCT No.: PCT/CN2018/096451
§ 371 (c)(1),
(2) Date: Jan. 23, 2020

(87) PCT Pub. No.: WO2019/024696
PCT Pub. Date: Feb. 7, 2019

(65) Prior Publication Data
US 2020/0213902 A1   Jul. 2, 2020

(30) Foreign Application Priority Data
Aug. 4, 2017   (CN) .......................... 201710659738.2

(51) Int. Cl.
*H04W 28/06* (2009.01)
*H04L 1/00* (2006.01)
(Continued)

(52) U.S. Cl.
CPC ........... *H04W 28/06* (2013.01); *H04L 1/0003* (2013.01); *H04W 72/0406* (2013.01);
(Continued)

(58) Field of Classification Search
None
See application file for complete search history.

(56) References Cited

U.S. PATENT DOCUMENTS

| 10,707,988 B2 * | 7/2020 | Salah .................... H04L 1/0028 |
| 2009/0199066 A1 * | 8/2009 | Kim ...................... H04L 1/0061 |
| | | 714/752 |

(Continued)

FOREIGN PATENT DOCUMENTS

| CN | 101378534 A | 3/2009 |
| CN | 101431791 A | 5/2009 |

(Continued)

OTHER PUBLICATIONS

Extended European Search Report from EP app. No. 18840627.6, dated Jun. 18, 2020.
(Continued)

*Primary Examiner* — Brandon M Renner
(74) *Attorney, Agent, or Firm* — Ladas & Parry, LLP

(57) ABSTRACT

A method, an apparatus and an equipment for determining a transport block size are provided. The method for determining a transport block size includes: determining an initial transport block size; comparing the initial transport block size with a threshold to obtain a comparison result; quantizing the initial transport block size based on the comparison result to obtain a quantized initial transport block size; and determining a final transport block size based on the quantized initial transport block size.

18 Claims, 4 Drawing Sheets

(51) Int. Cl.
*H04W 72/04* (2009.01)
*H04W 72/12* (2009.01)

(52) U.S. Cl.
CPC ... *H04W 72/1221* (2013.01); *H04W 72/1263* (2013.01); *H04W 72/1278* (2013.01)

(56) References Cited

U.S. PATENT DOCUMENTS

| | | | |
|---|---|---|---|
| 2012/0033767 A1* | 2/2012 | Wilborn | H04L 25/03184 375/341 |
| 2012/0177089 A1* | 7/2012 | Pelletier | H04W 72/14 375/219 |
| 2015/0271802 A1 | 9/2015 | Kang et al. | |
| 2016/0234812 A1 | 8/2016 | Kim et al. | |
| 2017/0135098 A1 | 5/2017 | Kang et al. | |
| 2017/0230970 A1 | 8/2017 | Kim et al. | |

FOREIGN PATENT DOCUMENTS

| | | |
|---|---|---|
| CN | 100860977 A | 10/2010 |
| CN | 101860977 A | 10/2010 |
| CN | 102118793 A | 7/2011 |
| CN | 102469566 A | 5/2012 |
| CN | 105960787 A | 9/2016 |
| EP | 2086143 A2 | 5/2008 |
| JP | 2011504038 A | 1/2011 |
| KR | 101526990 B1 | 6/2015 |
| KR | 20150111823 A | 10/2015 |
| WO | 2016018125 A1 | 2/2016 |

OTHER PUBLICATIONS

International Search Report from PCT/CN2018/096451, dated Sep. 25, 2018, with English translation provided by WIPO.
Written Opinion from the International Searching Authority from PCT/CN2018/096451, dated Sep. 25, 2018, with English translation provided by WIPO.
International Preliminary Report on Patentability from PCT/CN2018/096451, dated Feb. 4, 2020, with English translation from WIPO.
Notification of Reason for Refusal from KR app. No. 10-2020-7005928, dated Jan. 7, 2021, with English translation from Global Dossier.
Second Office Action from CN app. No. 201710659738.2, dated Nov. 23, 2020, with English translation from Global Dossier.
Notice of Reasons for Refusal from JP app. No. 2020-506256, dated Mar. 23, 2021, with English translation from Global Dossier.
"Transport block size determination", Rl-1710720, 3GPP TSG RAN WG1 NR Ad-Hoc#2, Qingdao, P.R. China, Jun. 27-30, 2017.
"CB Segmentation on Data Channel", Rl-1710742, 3GPP TSG RAN WG1 NR Ad-Hoc#2, Qingdao, P.R. China, Jun. 27-30, 2017.
"On MCS/transport Block Size Determination", Rl-1711501, 3GPP TSG RAN WG1 NR Ad-Hoc#2, Qingdao, P.R. China, Jun. 27-30, 2017.

* cited by examiner

METHOD, APPARATUS AND EQUIPMENT FOR DETERMINING TRANSPORT BLOCK SIZE

CROSS-REFERENCE TO RELATED APPLICATIONS

This application is the U.S. national phase of PCT Application No. PCT/CN2018/096451 filed on Jul. 20, 2018, which claims a priority to Chinese Patent Application No. 201710659738.2 filed on Aug. 4, 2017, the disclosures of which are incorporated in their entireties by reference herein.

TECHNICAL FIELD

The present disclosure relates to the field of communication technology, in particular to a method, an apparatus and an equipment for determining a transport block size.

BACKGROUND

In LTE (Long Term Evolution), a size of a transport block carried by a data channel can be obtained by means of a look-up table. Data channel resources in LTE are allocated in a unit of PRB (Physical Resource Block) pair. In designing a TBS (Transport Block Size) table, it is assumed that the quantity of RE (Resource Element) available for data channel transmission in each PRB pair is fixed.

However, the resource allocation of data channels in NR (New Radio) is more flexible. For example, resources may be allocated for one slot, one or more symbols, or multiple slots in one scheduling. Because resource scheduling in NR is more flexible than LTE, the TBS determination method of LTE cannot be directly used in NR.

A method for dynamically calculating TBS based on scheduling information is proposed in the related art. Although this method is flexible to calculate TBS based on resource allocation, the quantity of bytes of the obtained TBS may be arbitrary, which obviously does not adapt to the characteristics of only verifying and optimizing code blocks of a specific length in the NR, thus the performance of the transport block cannot be guaranteed.

SUMMARY

In view of this, the present disclosure provides a method, an apparatus, and an equipment for determining a transport block size, so as to ensure the performance of a transport block in an NR system.

In a first aspect, a method for determining a transport block size is provided according to some embodiments of the present disclosure, which includes:
  determining an initial transport block size;
  comparing the initial transport block size with a threshold to obtain a comparison result;
  quantizing the initial transport block size based on the comparison result to obtain a quantized initial transport block size; and
  determining a final transport block size based on the quantized initial transport block size.

Optionally, determining the initial transport block size includes:
  receiving scheduling information; and
  determining the initial transport block size based on the scheduling information.

Optionally, the determining the initial transport block size includes:
  receiving scheduling information;
  determining the quantity of layers of codeword mapping; and
  determining the initial transport block size based on the scheduling information and the quantity of layers of codeword mapping.

Optionally, quantizing the initial transport block size based on the comparison result to obtain the quantized initial transport block size includes:
  determining, in a case that the comparison result indicates that the initial transport block size is smaller than or equal to the threshold, the quantized initial transport block size according to the following equation:

$$B = Km,$$

where B is the quantized initial transport block size, Km is a value selected from set K, and elements in the set K are positive integers.

Optionally, quantizing the initial transport block size based on the comparison result to obtain the quantized initial transport block size further includes:
  determining, in a case that the comparison result indicates that the initial transport block size is greater than the threshold, the quantized initial transport block size according to the following equation:

$$B = C \times (K_n' - L_{CB}),$$

where B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check CRC code of a code block, and Y is the threshold.

Optionally, the set K is a predefined set or a preconfigured set, or the set K is a set calculated based on a calculation parameter.

Optionally, a minimum value in the set K' is greater than $$\frac{(C-1) \times Y}{C},$$

where $$C = \left\lceil \frac{B\_temp}{Y - L_{CB}} \right\rceil,$$

B_temp is the initial transport block size, $L_{CB}$ is the length of the CRC code of the code block, and Y is the threshold.

Optionally, the set K' is a subset of the set K.

Optionally, Km is selected according to one of the following criterions:
  criterion 1: Km is a minimum value of values in the set K that are greater than or equal to the initial transport block size; or
  criterion 2: Km is a maximum value of values in the set K that are smaller than or equal to the initial transport block size; or criterion 3: Km is a value in the set K, wherein an absolute value of a difference between the value and the initial transport block size is minimum, where in a case that at least two values of Km meet the criterion 1, the criterion 2 or the criterion 3, a final value of Km is determined as a minimum value or a maximum value of the at least two values.

Optionally, $K_n'$ is selected according to one of the following criterions:

criterion 1: $K_n'$ is a minimum value of values in the set K' that meet B_temp≤C×(Ki'-$L_{CB}$); or criterion 2: $K_n'$ is a maximum value of values in the set K' that meet B_temp≥C×(Ki'-$L_{CB}$); or criterion 3: $K_n'$ is a value in the set K' that renders an absolute value of a difference between C×(Ki'-$L_{CB}$) and B_temp to be minimum, where $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element in the set K'.

Optionally, in a case that at least two values of $K_n'$ meet the criterion 1, the criterion 2 or the criterion 3, a final value of $K_n'$ is determined as a minimum value or a maximum value of the at least two values.

Optionally, determining the final transport block size based on the quantized initial transport block size includes:

determining, as the final transport block size, a difference between the initial transport block size and a CRC length of a transport block.

Optionally, determining the final transport block size based on the quantized initial transport block size includes:

determining, as the final transport block size, a product of the quantity of layers of codeword mapping and a difference between the initial transport block size and a CRC length of a transport block.

Optionally, the threshold is equal to a maximum length of a code block.

Optionally, the method further includes:

quantizing a target element in the set K and/or the set K' that is not a multiple of 8, to render the target element to be a multiple of 8.

Optionally, after quantizing the initial transport block size based on the comparison result to obtain the quantized initial transport block size, the method further includes:

quantizing the quantized initial transport block size to be a multiple of 8.

Optionally, after determining the final transport block size based on the quantized initial transport block size, the method further includes:

quantizing the final transport block size to be a multiple of 8.

In a second aspect, an apparatus for determining a transport block size is provided according to some embodiments of the present disclosure, which includes: a processor, a transceiver and a program that is stored on a memory and is executable on the processor, where when executing the program, the processor is configured to:

determine an initial transport block size;

compare the initial transport block size with a threshold to obtain a comparison result;

quantize the initial transport block size based on the comparison result to obtain a quantized initial transport block size; and determine a final transport block size based on the quantized initial transport block size.

Optionally, in determining the initial transport block size, the processor is configured to:

receive scheduling information; and determine the initial transport block size based on the scheduling information.

Optionally, in determining the initial transport block size, the processor is further configured to:

receive scheduling information;

determine the quantity of layers of codeword mapping; and determine the initial transport block size based on the scheduling information and the quantity of layers of codeword mapping.

Optionally, in quantizing the initial transport block size based on the comparison result to obtain the quantized initial transport block size, the processor is configured to:

determine, in a case that the comparison result indicates that the initial transport block size is smaller than or equal to the threshold, the quantized initial transport block size according to the following equation:

$$B = Km,$$

where B is the quantized initial transport block size, Km is a value selected from a set K, and elements in the set K are positive integers.

Optionally, in quantizing the initial transport block size based on the comparison result to obtain the quantized initial transport block size, the processor is further configured to:

determine, in a case that the comparison result indicates that the initial transport block size is greater than the threshold, the quantized initial transport block size according to the following equation:

$$B = C \times (K_n' - L_{CB}),$$

where B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check CRC code of a code block, and Y is the threshold.

Optionally, the set K is a predefined set or a preconfigured set, or the set K is a set calculated based on a calculation parameter.

Optionally, a minimum value in the set K' is greater than $$\frac{(C-1) \times Y}{C},$$

where $$C = \left\lceil \frac{B\_temp}{Y - L_{CB}} \right\rceil,$$

B_temp is the initial transport block size, $L_{CB}$ is a length of a CRC code of a code block, and Y is the threshold.

Optionally, the set K' is a subset of the set K.

Optionally, Km is selected according to one of the following criterions:

criterion 1: Km is a minimum value of values in the set K that are greater than or equal to the initial transport block size; or criterion 2: Km is a maximum value of values in the set K that are smaller than or equal to the initial transport block size; or criterion 3: Km is a value in the set K, wherein an absolute value of a difference between the value and the initial transport block size is minimum.

Optionally, in a case that at least two values of Km meet criterion 1, criterion 2 or criterion 3, a final value of Km is determined as a minimum value or a maximum value of the at least two values.

Optionally, $K_n'$ is selected according to one of the following criterions:

criterion 1: $K_n'$ is a minimum value of values in the set K' that meet $B\_temp \leq C \times (Ki'-L_{CB})$; or criterion 2: $K_n'$ is a maximum value of values in the set K' that meet $B\_temp \geq C \times (Ki'-L_{CB})$; or criterion 3: $K_n'$ is a value in the set K' that renders an absolute value of a difference between $C \times (Ki'-L_{CB})$ and B_temp to be minimum, where $$C = \left\lceil \frac{B\_temp}{Y - L_{CB}} \right\rceil,$$

B_temp is the initial transport block size, $L_{CB}$ is the length of CRC code of the code block, Y is the threshold, and Ki' is an element in the set K'.

Optionally, in a case that at least two values of $K_n'$ meet the criterion 1, the criterion 2 or the criterion 3, a final value of $K_n'$ is determined as a minimum value or a maximum value of the at least two values.

Optionally, the processor is further configured to determine, as the final transport block size, a difference between the initial transport block size and a CRC length of a transport block.

Optionally, the processor is further configured to determine, as the final transport block size, a product of the quantity of layers of codeword mapping and a difference between the initial transport block size and a CRC length of a transport block.

Optionally, the threshold is equal to a maximum length of a code block.

Optionally, the processor is further configured to quantize a target element in the set K and/or the set K' that is not a multiple of 8, to render the target element to be a multiple of 8.

Optionally, the processor is further configured to quantize the quantized initial transport block size to be a multiple of 8.

Optionally, the processor is further configured to quantize the final transport block size to be a multiple of 8.

In a third aspect, a computer-readable storage medium is provided according to some embodiments of the present disclosure, which stores a program. The program, when being executed by a processor, configures the processor to perform steps of the method in the first aspect.

DETAILED DESCRIPTION

Specific implementations of the present disclosure are further described in detail hereinafter in conjunction with the drawings and some embodiments. The embodiments described hereinafter are intended for purpose of explanation of the present disclosure rather than limiting the scope of the present disclosure.

Figure 1:
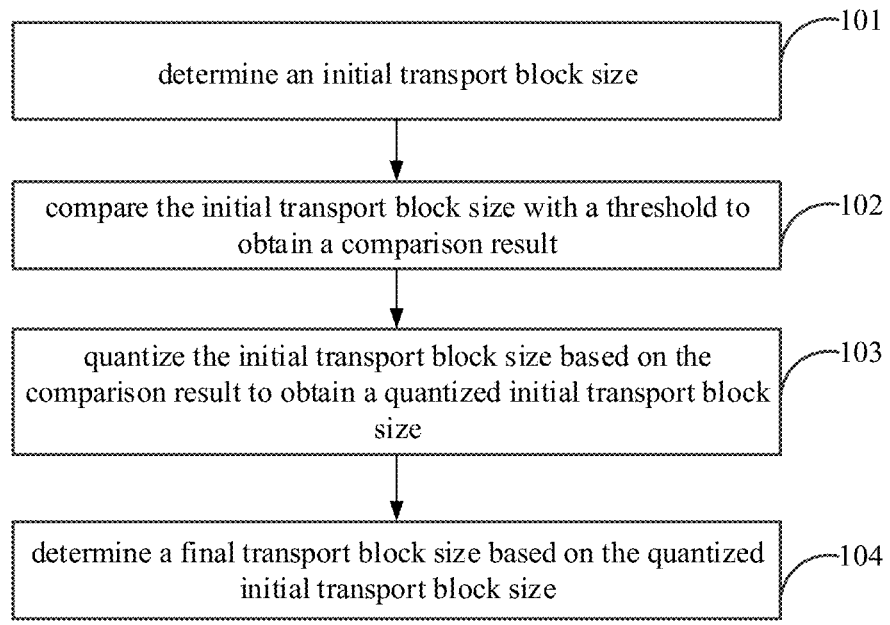
FIG. 1 is a flowchart of a method for determining a transport block size according to some embodiments of the present disclosure.

As shown in FIG. 1, a method for determining a transport block size is provided according to embodiments of the present disclosure, which includes steps 101 to 104.

Step 101 includes determining an initial transport block size.

In an embodiment of the present disclosure, the initial transport block size (TBS) may be determined in, but not limited to, the following two ways.

In a first way, scheduling information from a network side is received, and the initial transport block size is determined based on the scheduling information.

In a second way, scheduling information from a network side is received, the quantity of layers of codeword mapping is determined based on the scheduling information, and the initial transport block size is determined based on the scheduling information and the quantity of layers of codeword mapping.

Step 102 includes comparing the initial transport block size with a threshold to obtain a comparison result.

In an embodiment of the present disclosure, the threshold is equal to a maximum length of a code block. Notwithstanding, the threshold may be further adjusted according to practical needs.

Step 103 includes quantizing the initial transport block size based on the comparison result to obtain a quantized initial transport block size.

In this step, in a case that the comparison result indicates that the initial transport block size is smaller than or equal to the threshold, the quantized initial transport block size is:

B=Km, where B is the quantized initial transport block size, Km is a value selected from a set K, and elements in the set K are positive integers; and in a case that the comparison result indicates that the initial transport block size is greater than the threshold, the quantized initial transport block size is: B=C×($K_n'$-$L_{CB}$), where B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check (CRC) code of a code block, and Y is the threshold.

Herein, the set K is a predefined set or a preconfigured set, or the set K is a set calculated based on a calculation parameter.

A minimum value in the set K' is greater than $$\frac{(C-1) \times Y}{C},$$

where $$C = \left\lceil \frac{B\_temp}{Y - L_{CB}} \right\rceil,$$

B_temp is the initial transport block size, $L_{CB}$ is the length of the CRC code of the code block, and Y is the threshold. The set K' is a subset of the set K.

In a practical application, Km is selected according to one of the following criterions:

criterion 1: Km is a minimum value of values in the set K that are greater than or equal to the initial transport block size; or criterion 2: Km is a maximum value of values in the set K that are smaller than or equal to the initial transport block size; or criterion 3: Km is a value in the set K, wherein an absolute value of a difference between the value and the initial transport block size is minimum, where in a case that the quantity of values in Km meeting criterion 1, criterion 2 or criterion 3 is at least two, a minimum value or a maximum value of the at least two values is determined as a final value of Km. For example, under a certain condition, there are three candidate values in Km meeting criterion 3, a maximum value or a minimum value of the three candidate values in Km is selected as the final value of Km.

In another practical application, $K_n'$ is selected according to one of the following criterions:

criterion 1: $K_n'$ is a minimum value of values in the set K' that meet B_temp≤C×(Ki'-$L_{CB}$); or criterion 2: $K_n'$ is a maximum value of values in the set K' that meet B_temp≥C×(Ki'-$L_{CB}$); or criterion 3: $K_n'$ is a value selected from values in the set K' that enables an absolute value of a difference between C×(Ki'-$L_{CB}$) and B_temp to be minimum, where $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element from the set K'.

In a case that at least two values in $K_n'$ meet criterion 1, criterion 2 or criterion 3, a minimum value or a maximum value of the at least two values is determined as a final value of $K_n'$. For example, under a certain circumstance, three candidate values in $K_n'$ meet criterion 3, a maximum value or a minimum value of the three candidate values of $K_n'$ is selected as the final value of $K_n'$.

Step 104 includes determining a final transport block size based on the quantized initial transport block size.

In a case that a codeword is mapped to a single layer for transmission or that consideration is given into the quantity of layers of codeword mapping in calculation of the initial TBS, the final transport block size is a product of the quantity of layers of codeword mapping and a difference between the initial transport block size and a CRC length of a transport block. Otherwise, the final transport block size is the difference between the initial transport block size and the CRC length of a transport block.

By calculating TBS according to the technical solution of the embodiments of the present disclosure, it can be ensured that each block has a same length after the TBS is segmented into code blocks, so that multiple code blocks divided from one TBS have the same performance in an NR system. Further, by properly designing values of elements in the set K and/or the set K', the quantity of zeros filled in code block segmentation, encoding and interleaving processes can be minimized, thereby reducing encoding and decoding complexity, and maximally optimizing encoding and decoding performance of code blocks. In addition, by determining code block lengths that are fully tested and optimized in NR as values of elements in the set, performance of a transport block (TB) can be guaranteed.

Besides, to obtain a TBS that is integer times the length of a byte, in an embodiment of the present disclosure, a target element in the set K and/or the set K' that is not a multiple of 8 is quantized, to render the target element a multiple of 8. Optionally, the quantized initial transport block size may be quantized to be a multiple of 8. Optionally, the final transport block size may be quantized to be a multiple of 8.

In the following embodiments, implementations of the embodiments of the present disclosure are described in detail with reference to processing at a terminal side.

Figure 2:
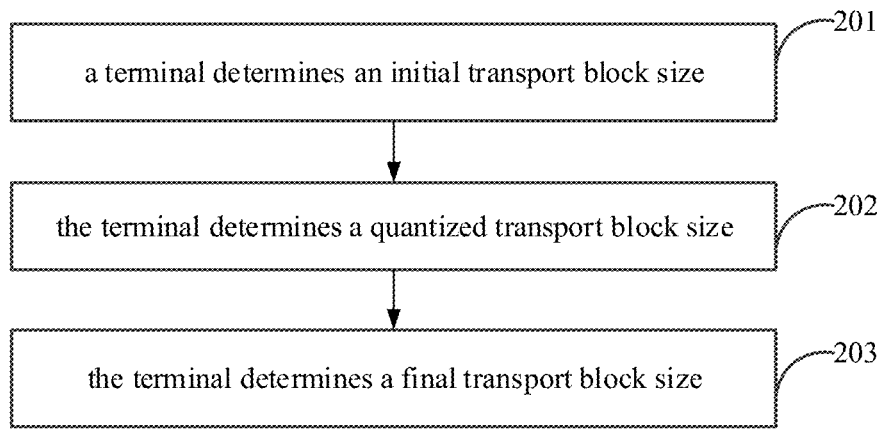
FIG. 2 is a flowchart of a method for determining a transport block size according to some embodiments of the present disclosure.

As shown in FIG. 2, a method for determining a transport block size is provided according to embodiments of the present disclosure, which includes steps 201 to 203.

Step 201 includes determining, by a terminal side, an initial transport block size TBS, which is denoted as B_temp.

Specifically, the terminal side determines B_temp based on scheduling information sent by a network side, and B_temp includes a CRC length of a transport block, where the CRC length is denoted as $L_{TB}$. In this embodiment, it is configured that the quantity of layers of codeword mapping is not considered in determining the initial transport block size.

In this step, the initial transport block size may be determined in the following two ways.

In a first way, the terminal side calculates the initial transport block size B_temp based on the scheduling information from the network side.

Specifically, the terminal side calculates the initial transport block size according to the following equation:

B_temp=$N_{RE}$×$Q_m$×R, where $N_{RE}$ is the quantity of resource elements (RE) occupied by an allocated data channel, $Q_m$ is an order of modulation, and R is a target code rate. $N_{RE}$ may be calculated based on time-frequency resources allocated by the network side, and the order of modulation and the target code rate may be obtained according to the scheduling information from the network side.

In a second way, the terminal side obtains the initial transport block size B_temp by looking up a table according to the scheduling information.

Specifically, a terminal obtains B_temp directly by looking up the table according to the scheduling information, or obtains B_temp by further conversion after looking up the table according to the scheduling information.

Step 202 includes determining, by the terminal, a quantized transport block size B.

Specifically, the quantized transport block size B is determined in the following way.

The initial transport block size is compared with a threshold to obtain a comparison result, and the initial transport block size is quantized based on the comparison result to obtain a quantized initial transport block size.

Specifically, if B_temp≤Y, B=Km and C=1; and
if B_temp>Y, B=C×($K_n'$-$L_{CB}$) and $$C = \left\lceil \frac{\text{B\_temp}}{Y - L_{CB}} \right\rceil,$$

where B is the quantized initial transport block size, B_temp is the initial transport block size, Km is a value selected from a set K, and elements in the set K are positive integers; and $K_n'$ is a value selected from a set K', $L_{CB}$ is a length of a cyclic redundancy check (CRC) code of a code block, and Y is the threshold. Preferably, Y is a maximum length of the code block.

In this embodiment, Km is a value from the set K. Specifically, Km is a minimum value of values in the set K that are greater than or equal to the initial transport block size, or a maximum value of values in the set K that are smaller than or equal to the initial transport block size, or a value in the set K that is closest to B_temp. The term "closest" refers to that an absolute value of a difference between a value in the set K and the initial transport block size is smaller than absolute values of differences between any other values in the set K and the initial transport block size. It may be further defined that in a case that two values in the set K each meets one of above conditions, the smaller or the greater one of the two values is selected.

In this embodiment, is a value from the set K'.

Specifically, $K_n'$ is a minimum value of values in the set K' that meet B_temp≤C×(Ki'-$L_{CB}$), or a maximum value of values in the set K that meet B_temp≥C×(Ki'-$L_{CB}$), or a value selected from values in the set K that renders C×(Ki'-$L_{CB}$) closest to B_temp. The term "closest" refers to that $K_n'$ is a value in the set K' that renders an absolute value of a difference between C×(Ki'-$L_{CB}$) and B_temp to be minimum. It can be further provided that in a case that two values in the set K' each meets one of above conditions, the smaller or the greater one of the two values is selected.

A minimum value in the set K is greater than $$\frac{(C-1) \times Y}{C}.$$

Preferably, the set K' is a subset K of which a minimum value is greater than $$\frac{(C-1) \times Y}{C}.$$

Step 203 includes determining, by the terminal side, a final transport block size, which is denoted as B_final.

In this embodiment, no consideration is given into the quantity of layers of codeword mapping in determining the initial TBS, thus B_final=(B-$L_{TB}$)×v, where v is the quantity of layers of codeword mapping.

Implementations of the above embodiments are described in detail hereinafter in conjunction with different ways to obtain the set K.

In an embodiment of the present disclosure, the set K is a predefined set or a preconfigured set, or the set K is a set calculated based on a calculation parameter.

In a first scenario, the set K is a set predefined in a protocol.

Specifically, possible values in the set K are as shown in the following table 1, for example, that is,
{40,48, . . . ,512,528,544, . . . ,1024,1056,1088, . . . , 2048,2112,2176, . . . ,6144,6272,6400, . . . ,8448}.

TABLE 1

|  | 40 ≤ K ≤ 512 | 528 ≤ K ≤ 1024 | 1056 ≤ K ≤ 2048 | 2112 ≤ K ≤ 6144 | 6272 ≤ K ≤ 8448 |
|---|---|---|---|---|---|
| step | 8 | 16 | 32 | 64 | 128 |

Assuming the maximum length Y of a code block is 8448, then K∈{40,48, . . . ,512,528,544, . . . ,1024,1056, 1088, . . . ,2048,2112,2176, . . . ,6144,6272,6400, . . . ,8448}.

Assuming the initial transport block size B_temp=6636, then B_temp≤Y=8448, C=1 and B=Km. Further, assuming the protocol defines that Km is a maximum value of values in the set K that are smaller than or equal to B_temp, then the quantized transport block size B=6272 in case of B_temp=6636.

In a similar way, assuming the protocol provides that Km is a minimum value of values in the set K that are greater than or equal to B_temp, then the quantized transport block size B=6400 in case of B_temp=6636.

Assuming the protocol provides that Km is a value in the set K that is closest to B_temp and that the greater one of two values in the set K that both meet the provision is selected, then the quantized transport block size B=6400 in case of B_temp=6636.

Assuming the initial transport block size B_temp=15264 and the CRC length $L_{CB}$ of a code block is 24 bits, then B_temp>Y=8448, and hence B=C×($K_n'$-$L_{CB}$), where $$C = \left\lceil \frac{\text{B\_temp}}{Y - L_{CB}} \right\rceil = \left\lceil \frac{15264}{8448 - 24} \right\rceil = 2.$$

Further, it is assumed that the protocol provides that $K_n'$ is a value in the set K' that renders C×(Ki'-$L_{CB}$) closest to B_temp. The set K' is a subset of the set K, where a minimum value in the set K' is greater than $$\frac{(C-1) \times Y}{C},$$

that is, K'∈{4224,4288, ... ,6144,6272,6400, ... ,8448}; hence $K_n'$=7680. Therefore, the quantized transport block size B=C×($K_n'$-$L_{CB}$)=2×(7680-24)=15312 in case of B_temp=6636.

Assuming the maximum length Y of a code block is equal to 2560 with other assumptions in the above case of Y=8448 reserved, then K∈{40,48, ... ,512,528,544, ... ,1024,1056, 1088, ... ,2048,2112,2176, ... ,2560}.

Still assuming the initial TBS B_temp=6636, then B=C× ($K_n'$-$L_{CB}$), where $$C = \left\lceil \frac{B\_temp}{Y - L_{CB}} \right\rceil = \left\lceil \frac{6336}{2560 - 24} \right\rceil = 3,$$

the set K' is a subset of the set K, where a minimum value in the set K' is greater than $$\frac{(C-1)Y}{C} = \frac{2 \times 2560}{3},$$

K'∈{1728,1760, ... ,2560}, $K_n'$=2112, and the quantized transport block size is B=C×($K_n'$-$L_{CB}$)=3×(2112-24)=6264.

At last, the final transport block size B_final is determined based on the quantized transport block size B.

Assuming B=6264, $L_{TB}$=24 and v=2, then B_final=(B-$L_{TB}$)×v=12480.

In a second scenario, the set K is a preconfigured set.

Specifically, for example, the network side configures the set K for the terminal, where the set K is a subset of the set K in the first scenario. In this case, the transport block size is determined in the similar way as in the first scenario except the determination of the set K.

In a third scenario, the set K is a set calculated based on a calculation parameter.

Specifically, for example, elements in the set K are Kb*Z, where Z is a set of sizes of LDPC lifting and values of Z are shown in the following table 2.

TABLE 2

| | | | | a | | | | |
|---|---|---|---|---|---|---|---|---|
| Z | 2 | 3 | 5 | 7 | 9 | 11 | 13 | 15 |
| j | 0 | 2 | 3 | 5 | 7 | 9 | 11 | 13 | 15 |
| | 1 | 4 | 6 | 10 | 14 | 18 | 22 | 26 | 30 |
| | 2 | 8 | 12 | 20 | 28 | 36 | 44 | 52 | 60 |
| | 3 | 16 | 24 | 40 | 56 | 72 | 88 | 104 | 120 |
| | 4 | 32 | 48 | 80 | 112 | 144 | 176 | 208 | 240 |
| | 5 | 64 | 96 | 160 | 224 | 288 | 352 | | |
| | 6 | 128 | 192 | 320 | | | | | |
| | 7 | 256 | 384 | | | | | | |

Kb is determined based on base graph (BG) 1 or BG2 in conjunction with a code length. Taking BG1 for example, Kb=22. In this case, the set K is {44, 66, 88, 110, 132, 154, 176, 198, 220, 242, 264, 308, 352, ... , 8448}.

Further, a value that is not integer times the length of a byte (not integral multiple of 8) is quantized. For example, 66 is quantized to be 64 or 72. The value may be quantized to be a minimum integer multiple of the length of a byte that is greater than the value, a maximum integer multiple of the length of a byte that is smaller than the value, or an integer multiple of the length of a byte that is closest to the value. Optionally, byte quantization is not performed on values in the set that are not integer times the length of a byte, but is performed on the quantized TBS or the final TBS.

With the assumptions in case of Y=8448 in the first scenario reserved, in case of B_temp=15264, B=C×($K_n'$-$L_{CB}$), where C=2, K'∈{4224,4576, ... ,8448}, and $K_n'$=7744. In this case, the quantized transport block size is B=15440.

At last, the final transport block size B_final is determined based on the quantized transport block size B.

Figure 3:
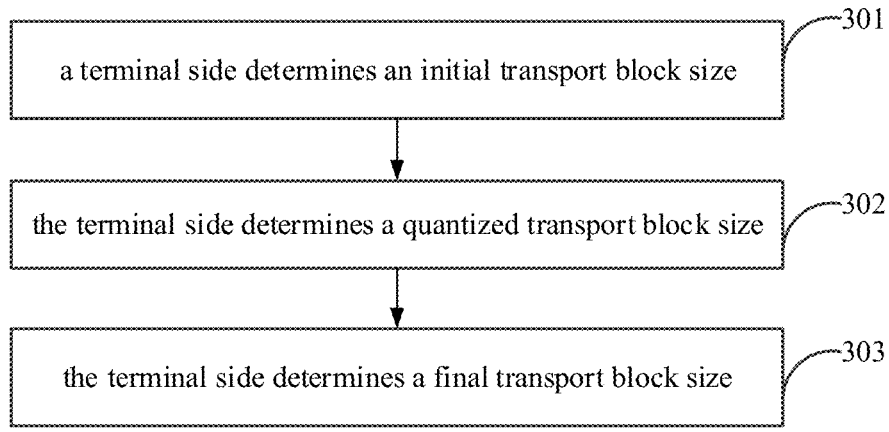
FIG. 3 is a flowchart of a method for determining a transport block size according to some embodiments of the present disclosure.

As shown in FIG. 3, a method for determining a transport block size is provided according to embodiments of the present disclosure, which includes steps 301 to 303.

Step 301 includes determining, by a terminal side, an initial transport block size TBS, which is denoted as B_temp.

Specifically, the terminal side determines B_temp based on scheduling information sent by a network side, and B_temp includes a CRC length of a transport block, where the CRC length is denoted as $L_{TB}$. The quantity of layers of codeword mapping is not considered in determining the initial transport block size.

Some specific ways of obtaining the initial TBS are described in the following.

In a first way, the terminal side calculates the initial transport block size B_temp based on the scheduling information from the network side.

Specifically, the terminal side calculates the initial transport block size according to the following equation:

$$B\_temp = N_{RE} \times Q_m \times R \times v,$$

where $N_{RE}$ is the quantity of resource elements (RE) occupied by an allocated data channel, $Q_m$ is an order of modulation, and R is a target code rate. $N_{RE}$ may be calculated based on time-frequency resources allocated by the network side, and the order of modulation and the target code rate may be obtained according to the scheduling information from the network side. v is the quantity of layers of codeword mapping and is obtained according to the scheduling information from the network side.

In a second way, the terminal side obtains the initial transport block size B_temp by looking up a table according to the scheduling information.

Specifically, a terminal obtains B_temp directly by looking up the table with the scheduling information, or obtains B_temp by further conversion after looking up the table according to the scheduling information.

Step 302 includes determining, by a terminal side, a quantized transport block size B.

Reference may be made to description in the above step 202 for implementation of this step.

Step 303 includes determining, by the terminal side, a final transport block size, which is denoted as B_final.

As in this embodiment, consideration is given into the quantity of layers of codeword mapping in determining the initial TBS, B_final=B-$L_{TB}$.

Assuming B=6264 and $L_{TB}$=24, then B_final=B-$L_{TB}$=6240.

The method for determining a transport block size according to the embodiments of the present disclosure is applicable to 5G NR. As can be seen from the descriptions above, with the present disclosure, TBS can be obtained by calculation according to a uniform formula, and it can be ensured that each block has a same length after the TBS is segmented into code blocks, and that the length of a code block is equal to a value in a predetermined set. By properly designing values of elements in the set K and/or the set K', the quantity of zeros filled in code block segmentation, encoding and interleaving processes can be minimized, thereby reducing the encoding and decoding complexity, and maximally optimizing encoding and decoding performance of code blocks. In addition, by determining code block lengths that are fully tested and optimized in NR as values of elements in the set, performance of a TB can be guaranteed.

Figure 4:
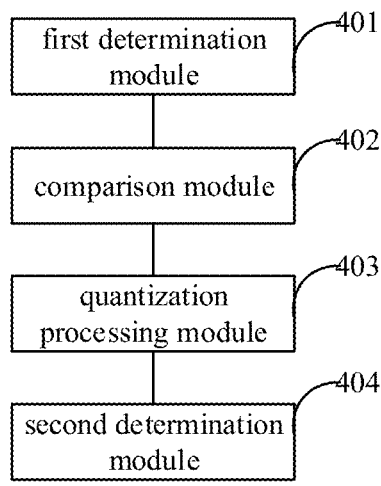
FIG. 4 is a schematic diagram of an apparatus for determining a transport block size according to some embodiments of the present disclosure.

As shown in FIG. 4, an apparatus for determining a transport block size is provided according to an embodiment of the present disclosure, which includes:

a first determination module 401, configured to determine an initial transport block size;

a comparison module 402, configured to compare the initial transport block size with a threshold to obtain a comparison result;

a quantization processing module 403, configured to quantize the initial transport block size based on the comparison result to obtain a quantized initial transport block size; and a second determination module 404, configured to determine a final transport block size based on the quantized initial transport block size.

Figure 5:
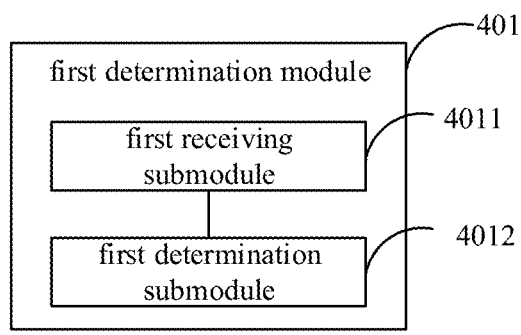
FIG. 5 is a schematic diagram of a first determination module according to some embodiments of the present disclosure.

As shown in FIG. 5, the first determination module 401 includes:

a first receiving submodule 4011, configured to receive scheduling information; and a first determination submodule 4012, configured to determine the initial transport block size based on the scheduling information.

Figure 6:
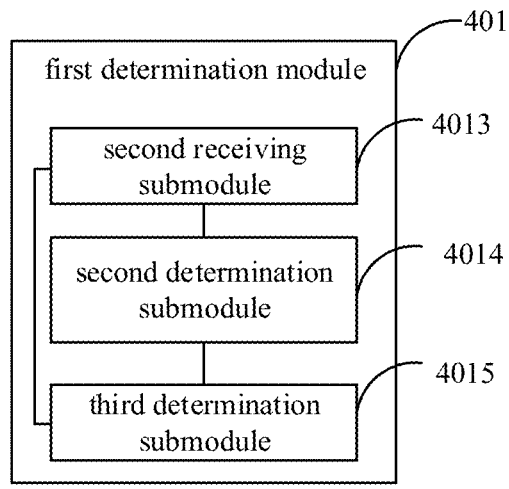
FIG. 6 is a schematic diagram of a first determination module according to some embodiments of the present disclosure.

As shown in FIG. 6, the first determination module 401 includes:

a second receiving submodule 4013, configured to receive scheduling information;

a second determination submodule 4014, configured to determine the quantity of layers of codeword mapping; and a third determination submodule 4015, configured to determine the initial transport block size based on the scheduling information and the quantity of layers of codeword mapping.

Figure 7:
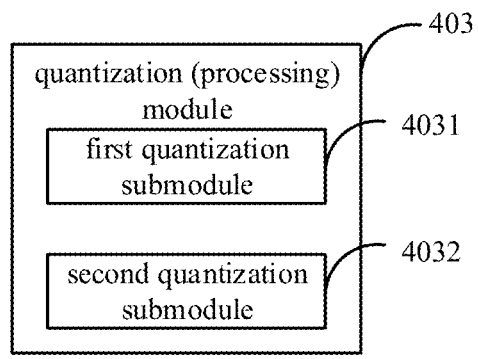
FIG. 7 is a schematic diagram of a quantization processing module according to some embodiments of the present disclosure.

As shown in FIG. 7, the quantization processing module 403 includes:

a first quantization submodule 4031, configured to determine, in a case that the comparison result indicates that the initial transport block size is smaller than or equal to the threshold, the quantized initial transport block size according to the following equation:

$$B=Km,$$

where B is the quantized initial transport block size, Km is a value selected from a set K, and elements in set K are positive integers; or a second quantization submodule 4032, configured to determine, in a case that the comparison result indicates that the initial transport block size is greater than the threshold, the quantized initial transport block size according to the following equation:

$$B=C\times(K_n'-L_{CB}),$$

where B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check (CRC) code of a code block, and Y is the threshold.

The set K is a predefined set or a preconfigured set, or the set K is a set calculated based on a calculation parameter.

A minimum value in the set K' is greater than $$\frac{(C-1)\times Y}{C},$$

where $$C = \left\lceil \frac{B\_temp}{Y - L_{CB}} \right\rceil,$$

B_temp is the initial transport block size, $L_{CB}$ is the length of the CRC code of the code block, and Y is the threshold.

The set K' is a subset of the set K.

Km is determined according to one of the following criterions:

criterion 1: Km is a minimum value of values in the set K that are greater than or equal to the initial transport block size; or criterion 2: Km is a maximum value of values in the set K that are smaller than or equal to the initial transport block size; or criterion 3: Km is a first value in the set K, wherein an absolute value of a difference between the first value and the initial transport block size is minimum in absolute values of differences between values in the set K and the initial transport block size.

In a case that the quantity of Km meeting criterion 1, criterion 2 or criterion 3 is at least two, a minimum value or a maximum value of the at least two values is determined as a final value of Km.

$K_n'$ is determined according to one of the following criterions:

criterion 1: $K_n'$ is a minimum value of values in the set K' that meet B_temp≤C×(Ki'−$L_{CB}$); or criterion 2: $K_n'$ is a maximum value of values in the set K' that meet B_temp≥C×(Ki'−$L_{CB}$); or criterion 3: $K_n'$ is a value selected from values in the set K' that enables an absolute value of a difference between C×(Ki'−$L_{CB}$) and B_temp to be minimum, where $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element in the set K'.

In a case that the quantity of $K_n'$ meeting criterion 1, criterion 2 or criterion 3 is at least two, a minimum value or a maximum value of the at least two values is determined as a final value of $K_n'$.

The second determination module 404 is configured to determine a difference between the initial transport block size and a CRC length of a transport block to be the final transport block size.

The second determination module 404 is configured to determine a product of the quantity of layers of codeword mapping and a difference between the initial transport block size and a CRC length of a transport block to be the final transport block size.

The threshold is equal to a maximum length of a code block.

Figure 8:
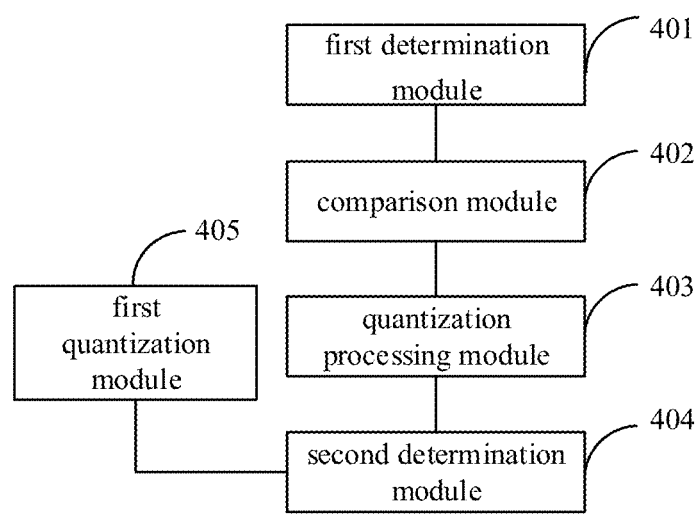
FIG. 8 is a structural diagram of an apparatus for determining a transport block size according to some embodiments of the present disclosure.

As shown in FIG. 8, the apparatus further includes a first quantization module 405 configured to quantize a target element in the set K and/or the set K' that is not a multiple of 8, to make the target element a multiple of 8.

Figure 9:
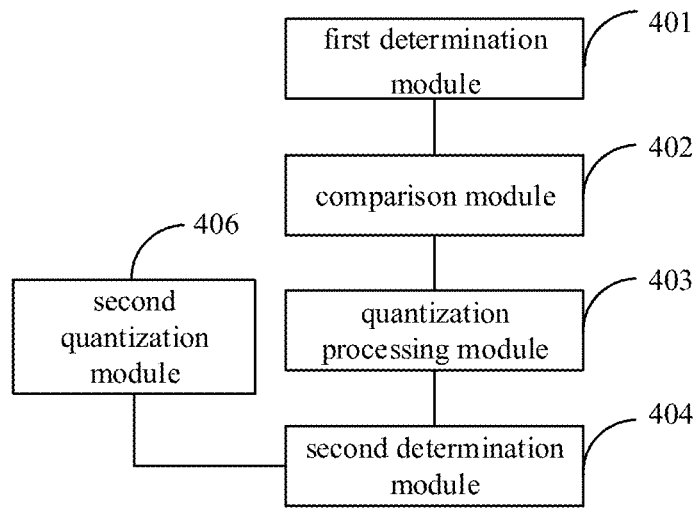
FIG. 9 is a structural diagram of an apparatus for determining a transport block size according to some embodiments of the present disclosure.

As shown in FIG. 9, the apparatus further includes a second quantization module 406 configured to quantize the quantized initial transport block size to be a multiple of 8.

Figure 10:
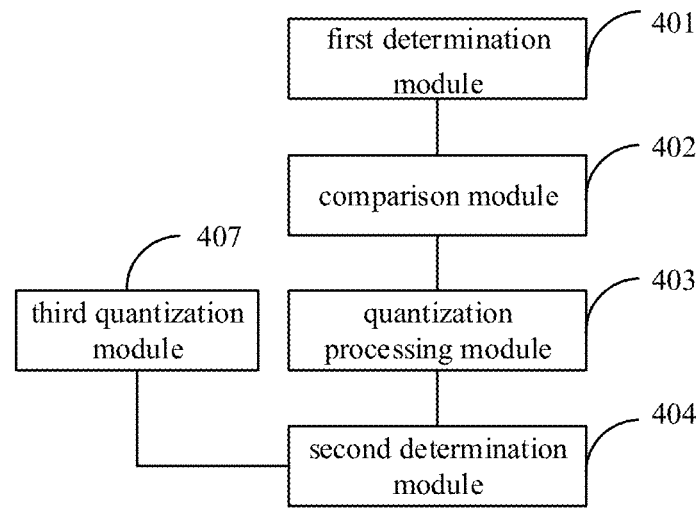
FIG. 10 is a structural diagram of an apparatus for determining a transport block size according to some embodiments of the present disclosure.

As shown in FIG. 10, the apparatus further includes a third quantization module 407 configured to quantize the final transport block size to be a multiple of 8.

As can be seen from the descriptions above, with the present disclosure, TBS can be obtained by calculation according to a uniform formula, and it can be ensured that each block has an same length after code block segmentation of the TBS and that a length of a code block is equal to a value in a predetermined set. By properly designing values of elements in the set K and/or the set K', the quantity of zeros filled in code block segmentation, encoding and interleaving processes can be minimized, thereby reducing encoding and decoding complexity, and maximally optimizing encoding and decoding performance of code blocks. In addition, by determining code block lengths that are fully tested and optimized in NR to be values of elements in the set, performance of a TB can be guaranteed.

Figure 11:
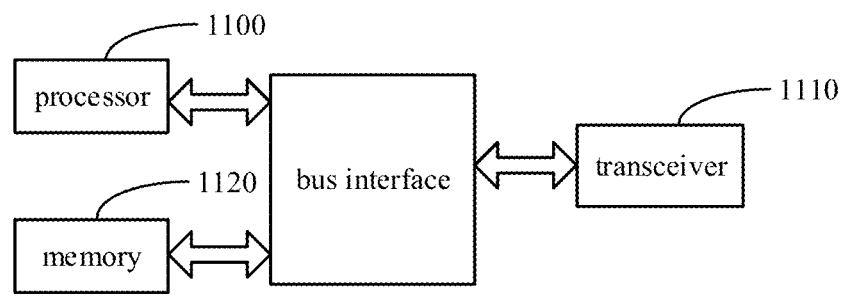
FIG. 11 is a schematic diagram of an electronic equipment according to some embodiments of the present disclosure.

As shown in FIG. 11, an electronic equipment is provided according to embodiments of the present disclosure, which includes:

a processor 1100 configured to read a program in a memory 1120 to: determine an initial transport block size, compare the initial transport block size with a threshold to obtain a comparison result, quantize the initial transport block size based on the comparison result to obtain a quantized initial transport block size and determine a final transport block size based on the quantized initial transport block size; and a transceiver 1110, configured to receive and transmit data under the control of the processor 1100.

The bus architecture in FIG. 11 may include any number of interconnected buses and bridges, which links various circuits such as one or multiple processors represented by the processor 1100 and memories represented by the memory 1120. The bus architecture can also link other circuit components such as an external device, a voltage stabilizer and a power management circuit, which is common knowledge in the art and therefore is not described in further detail. The bus interface provides interfaces. The transceiver 1110 may include multiple components, namely a transmitter and a receiver, which provides means for communications with other apparatuses on a transmission medium. The processor 1100 is responsible for management of the bus architecture and general processing, and the memory 1120 may store the data used by the processor 1100 in performing operations.

The processor 1100 is responsible for managing the bus architecture and routine processing, and the memory 1120 may store the data used by the processor 1100 in performing operations.

The processor 1100 is further configured to read a computer program to perform the following steps of:
receiving scheduling information; and
determining the initial transport block size based on the scheduling information.

The processor 1100 is further configured to read the computer program to perform the following steps of:

receiving scheduling information;
determining the quantity of layers of codeword mapping; and
determining the initial transport block size based on the scheduling information and the quantity of layers of codeword mapping.

The processor 1100 is further configured to read the computer program to perform the following steps of:
determining, in a case that the comparison result indicates that the initial transport block size is smaller than or equal to the threshold, the quantized initial transport block size according to the following equation:

$$B = Km,$$

where B is the quantized initial transport block size, Km is a value selected from a set K, and elements in set K are positive integers; or determining, in a case that the comparison result indicates that the initial transport block size is greater than the threshold, the quantized initial transport block size according to the following equation:

$$B = C \times (K_n' - L_{CB}),$$

where B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check (CRC) code of a code block, and Y is the threshold.

In an embodiment, the set K is a predefined set or a preconfigured set, or the set K is a set calculated based on a calculation parameter.

In an embodiment, a minimum value in the set K' is greater than $$\frac{(C-1) \times Y}{C},$$

where $$C = \left\lceil \frac{B\_temp}{Y - L_{CB}} \right\rceil,$$

B_temp is the initial transport block size, $L_{CB}$ is the length of the CRC code of the code block, and Y is the threshold.

In an embodiment, the set K' is a subset of the set K.

In an embodiment, Km is selected according to one of the following criterions:

criterion 1: Km is a minimum value of values in the set K that are greater than or equal to the initial transport block size; or criterion 2: Km is a maximum value of values in the set K that are smaller than or equal to the initial transport block size; or criterion 3: Km is a first value in the set K, wherein an absolute value of a difference between the first value and the initial transport block size is minimum in absolute values of differences between values in the set K and the initial transport block size.

In an embodiment, in a case that at least two values of Km meet the criterion 1, the criterion 2 or the criterion 3, a final value of Km is determined as a minimum value or a maximum value of the at least two values.

In an embodiment, $K_n'$ is selected according to one of the following criterions:

criterion 1: $K_n'$ is a minimum value of values in the set K' that meet B_temp≤C×(Ki'-$L_{CB}$); or criterion 2: $K_n'$ is a maximum value of values in the set K' that meet B_temp≥C×(Ki'-$L_{CB}$); or criterion 3: $K_n'$ is a value selected from values in the set K' that renders an absolute value of a difference between C×(Ki'-$L_{CB}$) and B_temp to be minimum, where $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element in the set K'.

In an embodiment, in a case that at least two values of $K_n'$ meet the criterion 1, the criterion 2 or the criterion 3, a final value of $K_n'$ is determined as a minimum value or a maximum value of the at least two values.

The processor 1100 is further configured to read the computer program to perform the following step of:

determining a difference between the initial transport block size and a CRC length of a transport block to be the final transport block size.

The processor 1100 is further configured to read the computer program to perform the following step of:

determining a product of the quantity of layers of codeword mapping and a difference between the initial transport block size and a CRC length of a transport block to be the final transport block size.

In an embodiment, the threshold is equal to a maximum length of a code block.

The processor 1100 is further configured to read the computer program to perform the following step of:

quantizing a target element in the set K and/or the set K' that is not a multiple of 8, to render the target element a multiple of 8.

The processor 1100 is further configured to read the computer program to perform the following step of:

quantizing the quantized initial transport block size to be a multiple of 8.

The processor 1100 is further configured to read the computer program to perform the following step of:

quantizing the final transport block size to be a multiple of 8.

Furthermore, a computer-readable storage medium for storing a computer program is provided according to an embodiment of the present disclosure, where when executed by a processor, the computer-readable program configures the processor to perform the following steps:

determining an initial transport block size;

comparing the initial transport block size with a threshold to obtain a comparison result;

quantizing the initial transport block size based on the comparison result to obtain a quantized initial transport block size; and determining a final transport block size based on the quantized initial transport block size.

In an embodiment, the determining an initial transport block size includes:

receiving scheduling information; and determining the initial transport block size based on the scheduling information.

In an embodiment, the determining an initial transport block size includes:

receiving scheduling information;

determining the quantity of layers of codeword mapping; and determining the initial transport block size based on the scheduling information and the quantity of layers of codeword mapping.

In an embodiment, the quantizing the initial transport block size based on the comparison result to obtain a quantized initial transport block size includes:

determining, in a case that the comparison result indicates that the initial transport block size is smaller than or equal to the threshold, the quantized initial transport block size according to the following equation:

$B = Km,$ where B is the quantized initial transport block size, Km is a value from set K, and elements in set K are positive integers; or determining, in a case that the comparison result indicates that the initial transport block size is greater than the threshold, the quantized initial transport block size according to the following equation:

$B = C \times (K_n' - L_{CB}),$ where B is the quantized initial transport block size, $$C = \left\lceil \frac{B\_temp}{Y - L_{CB}} \right\rceil,$$

$K_n'$ is a value from set K', B_temp is the initial transport block size, $L_{CB}$ is a length of a cyclic redundancy check (CRC) code of a code block, and Y is the threshold.

In an embodiment, the set K is a predefined set or a preconfigured set, or the set K is a set calculated based on a calculation parameter.

In an embodiment, a minimum value in the set K' is greater than $$\frac{(C-1) \times Y}{C},$$

where $$C = \left\lceil \frac{B\_temp}{Y - L_{CB}} \right\rceil,$$

B_temp is the initial transport block size, $L_{CB}$ is the length of the CRC code of the code block, and Y is the threshold.

In an embodiment, the set K' is a subset of the set K.

In an embodiment, Km is selected according to one of the following criterions:

criterion 1: Km is a minimum value of values in the set K that are greater than or equal to the initial transport block size; or criterion 2: Km is a maximum value of values in the set K that are smaller than or equal to the initial transport block size; or criterion 3: Km is a first value in the set K, wherein an absolute value of a difference between the first value and the initial transport block size is minimum in absolute values of differences between values in the set K and the initial transport block size.

In an embodiment, in a case that at least two values of Km meet the criterion 1, the criterion 2 or the criterion 3, a final value of Km is determined as a minimum value or a maximum value of the at least two values.

In an embodiment, $K_n'$ is selected according to one of the following criterions:

criterion 1: $K_n'$ is a minimum value of values in the set K' that meet $B\_temp \leq C \times (Ki'-L_{CB})$; or criterion 2: $K_n'$ is a maximum value of values in the set K' that meet $B\_temp \geq C \times (Ki'-L_{CB})$; or criterion 3: $K_n'$ is a value selected from values in the set K' that renders an absolute value of a difference between $C \times (Ki'-L_{CB})$ and B_temp to be minimum, where $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element in the set K'.

In an embodiment, in a case that at least two values of $K_n'$ meet the criterion 1, the criterion 2 or the criterion 3, a final value of $K_n'$ is determined as a minimum value or a maximum value of the at least two values.

In an embodiment, the determining a final transport block size based on the quantized initial transport block size includes:

determining a difference between the initial transport block size and a CRC length of a transport block to be the final transport block size.

In an embodiment, the determining a final transport block size based on the quantized initial transport block size includes:

determining a product of the quantity of layers of codeword mapping and a difference between the initial transport block size and a CRC length of a transport block to be the final transport block size.

In an embodiment, the threshold is equal to a maximum length of a code block.

In an embodiment, the method further includes:

quantizing a target element in the set K and/or the set K' that is not a multiple of 8, to render the target element a multiple of 8.

In an embodiment, after the quantizing the initial transport block size based on the comparison result to obtain a quantized initial transport block size, the method further includes:

quantizing the quantized initial transport block size to be a multiple of 8.

In an embodiment, after the determining a final transport block size based on the quantized initial transport block size, the method further includes:

quantizing the final transport block size to be a multiple of 8.

It should be understood that in the embodiments according to the present application, the disclosed apparatus and method may be implemented in other manners. For example, the apparatus embodiments described above are merely illustrative. For example, the division of the units is only a logical function division, and in practical implementations, there may be other ways of division. For example, multiple units or components may be combined or integrated into another system, or some features can be ignored or not implemented. In addition, the mutual coupling or direct coupling or communication connection shown or discussed may be implemented with some interfaces, and indirect coupling or communication connection between apparatuses or units may be electrical, mechanical or in other forms.

In addition, functional units in various embodiments of the present disclosure may be integrated into one processing unit, or each unit may exist physically separately, or at least two units may be integrated into one. The above integrated unit may be implemented in the form of hardware or a combination of hardware and software functional unit.

The integrated unit implemented in the form of a software functional unit may be stored in a computer-readable storage medium. The software functional unit is stored in a storage medium, which includes a number of instructions that cause a computer device (which may be a personal computer, a server or a network device) to perform all or some of the steps of the methods according to the embodiments of the present disclosure. The foregoing storage medium may include any storage medium that can store program codes, such as a USB flash drive, a portable hard disk, a read-only memory (ROM), a random access memory (RAM), a floppy disk, or an optical disc.

The above-described embodiments are optional embodiments of the present disclosure. It should be noted that numerous improvements and refinements may be made by those skilled in the art without deviating from the principle of the present disclosure, and that the improvements and refinements shall also fall within the scope of the present disclosure.

What is claimed is:

1. A method for determining a transport block size, comprising:

determining an initial transport block size;

comparing the initial transport block size with a threshold to obtain a comparison result;

quantizing the initial transport block size based on the comparison result to obtain a quantized initial transport block size; and determining a final transport block size based on the quantized initial transport block size, wherein quantizing the initial transport block size based on the comparison result to obtain the quantized initial transport block size comprises:

determining, in a case that the comparison result indicates that the initial transport block size is smaller than or equal to the threshold, the quantized initial transport block size according to the following equation:

$B=Km$, wherein B is the quantized initial transport block size, Km is a value selected from a set K, and elements in the set K are positive integers; or determining, in a case that the comparison result indicates that the initial transport block size is greater than the threshold, the quantized initial transport block size according to the following equation:

$B=C \times (K_n'-L_{CB})$, wherein B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check CRC code of a code block, and Y is the threshold.

2. The method according to claim 1, wherein determining the initial transport block size comprises:
   receiving scheduling information; and
   determining the initial transport block size based on the scheduling information.

3. The method according to claim 1, wherein determining the initial transport block size comprises:
   receiving scheduling information;
   determining the quantity of layers of codeword mapping; and
   determining the initial transport block size based on the scheduling information and the quantity of layers of codeword mapping.

4. The method according to claim 1, wherein the set K is a predefined set or a preconfigured set, or the set K is a set calculated based on a calculation parameter.

5. The method according to claim 1, wherein a minimum value in the set K' is greater than $$\frac{(C-1) \times Y}{C},$$

wherein $$C = \left\lceil \frac{B\_temp}{Y - L_{CB}} \right\rceil,$$

B_temp is the initial transport block size, $L_{CB}$ is the length of the CRC code of the code block, and Y is the threshold; and
   the set K' is a subset of the set K.

6. The method according to claim 1, wherein Km is selected according to one of the following criterions:
   criterion 1: Km is a minimum value of values in the set K that are greater than or equal to the initial transport block size; or
   criterion 2: Km is a maximum value of values in the set K that are smaller than or equal to the initial transport block size; or
   criterion 3: Km is a first value in the set K, wherein an absolute value of a difference between the first value and the initial transport block size is minimum in absolute values of differences between values in the set K and the initial transport block size, and
   wherein in a case that at least two values of Km meet the criterion 1, the criterion 2 or the criterion 3, a final value of Km is determined as a minimum value or a maximum value of the at least two values.

7. The method according to claim 1, wherein $K_n'$ is selected according to one of the following criterions:
   criterion 1: $K_n'$ is a minimum value of values in the set K' that meet B_temp≤C×(Ki'−$L_{CB}$); or
   criterion 2: $K_n'$ is a maximum value of values in the set K' that meet B_temp≥C×(Ki'−$L_{CB}$); or
   criterion 3: $K_n'$ is a value selected from values in the set K' that renders an absolute value of a difference between C×(Ki'−$L_{CB}$) and B_temp to be minimum, wherein $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element in the set K', and
   wherein in a case that at least two values of $K_n'$ meet the criterion 1, the criterion 2 or the criterion 3, a final value of $K_n'$ is determined as a minimum value or a maximum value of the at least two values.

8. The method according to claim 2, wherein determining the final transport block size based on the quantized initial transport block size comprises:
   determining, as the final transport block size, a difference between the initial transport block size and a CRC length of a transport block.

9. The method according to claim 3, wherein determining the final transport block size based on the quantized initial transport block size comprises:
   determining, as the final transport block size, a product of the quantity of layers of codeword mapping and a difference between the initial transport block size and a CRC length of a transport block, or
   wherein the threshold is equal to a maximum length of a code block.

10. The method according to claim 1, further comprising:
    quantizing a target element in at least one of the set K or the set K' that is not a multiple of 8, to render the target element to be a multiple of 8.

11. The method according to claim 1, wherein after quantizing the initial transport block size based on the comparison result to obtain the quantized initial transport block size, the method further comprises:
    quantizing the quantized initial transport block size to be a multiple of 8; or
    wherein after determining the final transport block size based on the quantized initial transport block size, the method further comprises:
    quantizing the final transport block size to be a multiple of 8.

12. An apparatus for determining a transport block size, comprising: a processor, a transceiver and a program that is stored on a memory and is executable on the processor, wherein when executing the program, the processor is configured to:
    determine an initial transport block size;
    compare the initial transport block size with a threshold to obtain a comparison result;
    quantize the initial transport block size based on the comparison result to obtain a quantized initial transport block size; and
    determine a final transport block size based on the quantized initial transport block size,
    wherein when quantizing the initial transport block size based on the comparison result to obtain the quantized initial transport block size, the processor is configured to:
    determine, in a case that the comparison result indicates that the initial transport block size is smaller than or equal to the threshold, the quantized initial transport block size according to the following equation:
    B=Km,
    wherein B is the quantized initial transport block size, Km is a value selected from a set K, and elements in the set K are positive integers; or
    determine, in a case that the comparison result indicates that the initial transport block size is greater than the threshold, the quantized initial transport block size according to the following equation:
    B=C×($K_n'$−$L_{CB}$), wherein B is the quantized initial transport block size, $$C = \left\lceil \frac{B\_temp}{Y - L_{CB}} \right\rceil,$$

$K_n'$ is a value selected from a set K', B_temp is the initial transport block size, $L_{CB}$ is a length of a cyclic redundancy check CRC code of a code block, and Y is the threshold.

13. The apparatus according to claim 12, wherein when determining the initial transport block size, the processor is configured to:
   receive scheduling information; and
   determine the initial transport block size based on the scheduling information, or
   wherein when determining the initial transport block size, the processor is further configured to:
   receive scheduling information;
   determine the quantity of layers of codeword mapping; and
   determine the initial transport block size based on the scheduling information and the quantity of layers of codeword mapping.

14. The apparatus according to claim 12, wherein the set K is a predefined set or a preconfigured set, or the set K is a set calculated based on a calculation parameter; or
   wherein a minimum value in the set K' is greater than $$\frac{(C-1) \times Y}{C},$$

wherein $$C = \left\lceil \frac{B\_temp}{Y - L_{CB}} \right\rceil,$$

B_temp is the initial transport block size, $L_{CB}$ is a length of a CRC code of a code block, and Y is the threshold; or
   wherein the set K' is a subset of the set K.

15. The apparatus according to claim 12, wherein Km is selected according to one of the following criterions:
   criterion 1: Km is a minimum value of values in the set K that are greater than or equal to the initial transport block size; or
   criterion 2: Km is a maximum value of values in the set K that are smaller than or equal to the initial transport block size; or
   criterion 3: Km is a value in the set K, wherein an absolute value of a difference between the value and the initial transport block size is minimum, and
   wherein in a case that at least two values of Km meet criterion 1, criterion 2 or criterion 3, a final value of Km is determined as a minimum value or a maximum value of the at least two values.

16. The apparatus according to claim 12, wherein $K_n'$ is selected according to one of the following criterions:
   criterion 1: $K_n'$ is a minimum value of values in the set K' that meet B_temp≤C×(Ki'-$L_{CB}$); or
   criterion 2: $K_n'$ is a maximum value of values in the set K' that meet B_temp≥C×(Ki'-$L_{CB}$); or
   criterion 3: $K_n'$ is a value in the set K' that renders an absolute value of a difference between C×(Ki'-$L_{CB}$) and B_temp to be minimum,
   wherein $$C = \left\lceil \frac{B\_temp}{Y - L_{CB}} \right\rceil,$$

B_temp is the initial transport block size, $L_{CB}$ is the length of the CRC code of the code block, Y is the threshold, and Ki' is an element in the set K', and
   wherein in a case that at least two values of $K_n'$ meet the criterion 1, the criterion 2 or the criterion 3, a final value of $K_n'$ is determined as a minimum value or a maximum value of the at least two values.

17. The apparatus according to claim 12, wherein the processor is further configured to determine, as the final transport block size, a difference between the initial transport block size and a CRC length of a transport block; or
   wherein the processor is further configured to determine, as the final transport block size, a product of the quantity of layers of codeword mapping and a difference between the initial transport block size and a CRC length of a transport block; or
   wherein the threshold is equal to a maximum length of a code block.

18. The apparatus according to claim 12, wherein the processor is further configured to quantize a target element in at least one of the set K or the set K' that is not a multiple of 8, to render the target element to be a multiple of 8; or
   wherein the processor is further configured to quantize the quantized initial transport block size to be a multiple of 8; or
   wherein the processor is further configured to quantize the final transport block size to be a multiple of 8.

* * * * *